May 11, 1965

P. BARKAN ETAL 3,183,330

CURRENT-LIMITING ELECTRIC CIRCUIT INTERRUPTER
OF THE FLUID BLAST TYPE

Filed March 21, 1961

Inventors:
Philip Barkan,
Ernest H. Bogert,
by William Freedman
Attorney.

Inventors:
Philip Barkan,
Ernest H. Bogert,
by William Freedman
Attorney.

Inventors:
Philip Barkan,
Ernest H. Bogert,
by William Freedman
Attorney.

United States Patent Office 3,183,330
Patented May 11, 1965

3,183,330
CURRENT-LIMITING ELECTRIC CIRCUIT INTERRUPTER OF THE FLUID BLAST TYPE
Philip Barkan, Lima, and Ernest H. Bogert, Media, Pa., assignors to General Electric Company, a corporation of New York
Filed Mar. 21, 1961, Ser. No. 97,355
20 Claims. (Cl. 200—150)

This invention relates to an electric circuit interrupter that is capable of interrupting short-circuit currents with a "current-limiting" action. More specifically, the invention relates to a circuit interrupter of this type which can be readily restored to its closed-circuit position after an interrupting operation and can then repeat the interrupting operation if called upon to do so.

By "current-limiting" action is meant the action of an interrupter in limiting the maximum instantaneous peak value of current which the interrupter permits to flow (maximum let-through current) under short circuit conditions to a value considerably lower in magnitude than the maximum available current, i.e., the maximum instantaneous peak value of current that would have been carried by the device had it retained its normal closed-circuit impedance value. This concept of current-limiting action is applicable to either alternating-current or direct-current circuits, and in both cases signifies that the peak instantaneous current is limited to a value considerably less than the full maximum instantaneous current which the power source is capable of delivering in the absence of current-limiting action.

Although there are electric fuses available that are capable of interrupting short-circuit currents with a current-limiting action, there are few, if any, actual circuit breakers that have such ability. As a result, it has been customary to rely upon current-limiting fuses in those circuit applications where current-limiting action is required or desired. As compared to circuit breakers, fuses are subject to certain well recognized disadvantages, such as their inability to perform more than a single interrupting operation; their inability to restore service after interruption; and the expenses involved in making the necessary replacement of the fuse after each operation. Circuit breakers, on the other hand, can be readily restored to their closed circuit position after an interrupting operation and can immediately repeat the interrupting operation if necessary. It would, therefore, be highly desirable if a circuit breaker were available capable of current-limiting action.

Accordingly, one of the objects of our invention is to provide a circuit breaker that is capable of interrupting short circuit currents with a current-limiting action.

To operate with current-limiting action, a circuit breaker must be capable of performing several distinct functions, all within an extremely short period. First of all, it must sense the presence of a short circuit or fault; it must then release its contacts in response to such a fault; and it must then increase the voltage drop across the circuit breaker to a value on the order of the instantaneous line voltage. In a conventional 60 cycle alternating current circuit, these three distinct functions must be performed within approximately 2 milliseconds (or about one-fourth of a half cycle) in order to achieve significant current-limiting action. Otherwise, the current through the interrupter will have attained substantially the maximum available value before the circuit breaker becomes effective.

Accordingly, another object of our invention is to provide a circuit breaker which is capable of performing these three distinct functions within the extremely short interval required to produce current-limiting action.

Another object of our invention is to produce high speed opening of the breaker contacts in response to heavy overcurrents within the interrupting rating of the circuit breaker by means of localized forces developed in the engaging regions of the contacts.

Still another object is to open the contacts in response to lower overcurrents by operating means so constructed that it does not impede the desired high speed opening motion of the contacts during heavy overcurrents.

Another object is to provide a fluid blast fuse that is capable of interrupting heavy overcurrents with a current-limiting action.

In carrying out our invention in one form, we provide a circuit breaker that comprises a pair of relatively movable butt-type contacts that are separable to establish an arcing gap across which an arc is drawn. Enclosing the arcing gap is an arcing chamber that is substantially completely filled with arc-extinguishing liquid when the contacts are in engagement. Means is provided for biasing one of the contacts into engagement with the other with a force less than the total contact-separating force developed in the abutting regions of the contacts during heavy overcurrents through said contacts within the interrupting rating of the circuit breaker so that said contacts separate automatically in response to these heavy overcurrents. One or both of the contacts is provided with exhaust passage means leading from the arcing gap through the contact in the general direction of motion of the contact. The arcing chamber is substantially imperforate except for this exhaust passage means so that the pressures generated by arcing force fluid into said exhaust passage means via paths extending radially inwardly about the periphery of the arcing gap. Means is also provided for severely restricting flow through the exhaust passage means from the time the contacts first part until a predetermined length of gap has been established whereby the arc develops relatively high pressures that act to continue separation of the contacts. When this predetermined length of gap has been established, the exhaust passage means is opened so that the high pressures within the arcing chamber can then drive fluid through the arcing gap and the exhaust passage means at an increased rate of flow.

For a better understanding of our invention, reference may be had to the following description taken in conjunction with the accompanying drawings, wherein.

Figure 1:
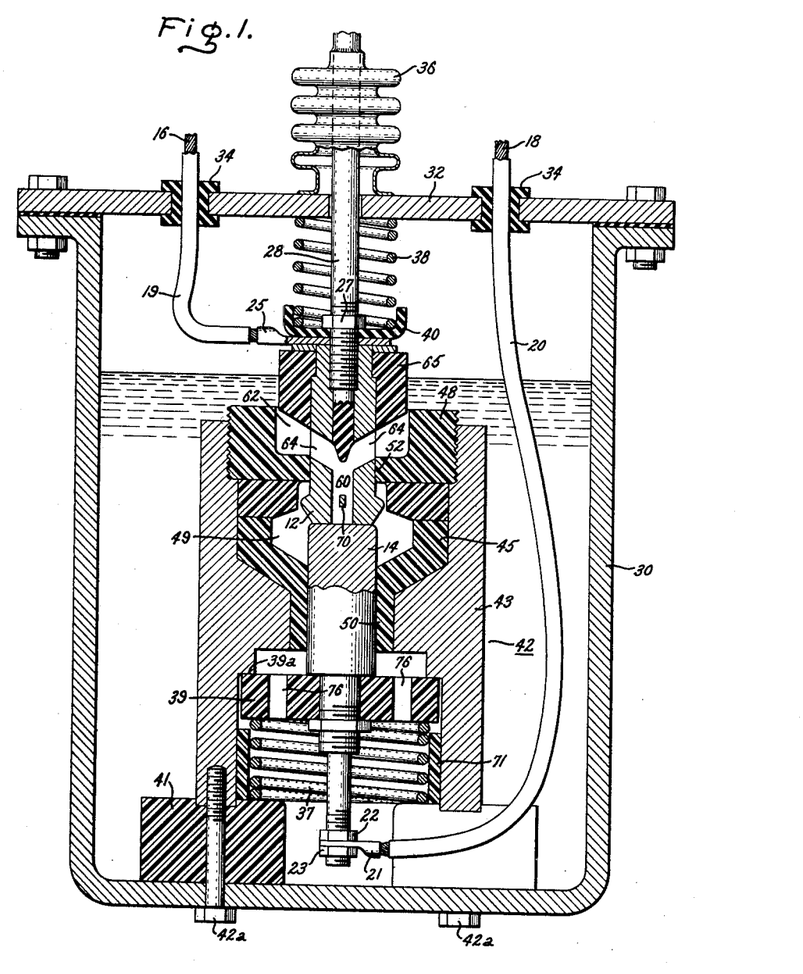
FIG. 1 is a cross-sectional view through a circuit breaker embodying one form of our invention. The circuit breaker is shown in its closed position.

Referring now to FIG. 1, the circuit breaker shown therein comprises a pair of relatively movable rod-shaped contacts or electrodes 12 and 14 connected across a pair of spaced-apart terminals 16 and 18. The upper rod contact 12 is electrically connected at its upper end to a flexible conductor 19 that provides an electrical connection between one of the terminals 16 and the rod contact 12. The lower rod contact 14 is electrically connected at its lower end to a flexible conductor 20 that provides an electrical connection between the other terminal 18 and the rod contact 14. Each of the flexible conductors 19 and 20 is shown with a conductive terminal lug suitably secured to its lower end and clamped to one of the contact rods by suitable nuts. For example, the lower terminal lug 21 is shown clamped between a pair of nuts 22, 23 threaded on an extennsion of the rod contact 14. The upper terminal lug 25 is shown clamped against a shoulder on the upper rod contact 12 by means of a nut 27 threaded on an insulating operating rod 28, which forms a mechanical extension of rod contact 12. It will therefore be apparent that the circuit through the interrupter extends between terminal 16 and 18 via the conductor 19, rod contacts 12 and 14, and the conductor 20.

In certain applications of our invention the circuit breaker can be a completely sealed unit, but in others it is desirable to provide a suitable vent for exhaust of the arcing products. The disclosed circuit breaker is a completely sealed unit, and, to this end, it comprises a metallic tank 30 having a cover 32 secured thereto and supporting the terminals 16 and 18 of the circuit breaker. Suitable insulating bushings 34 are provided about the conductors 19 and 20 in the region that they extend through the cover. These bushings prevent leakage into and out of the tank about the conductors and serve also to insulate the conductors from each other and from the cover 32. The insulating operating rod 28 which is secured to rod contact 12, is relied upon for imparting circuit-opening movement to the contact 12 under certain conditions soon to be described. This operating rod 28 extends freely through a slide bearing opening in the cover 32 and is surrounded by a flexible bellows 36 that permits the operating rod to be vertically reciprocated without leakage therearound.

The contacts 12 and 14 are of the butt-type and are normally maintained in abutting engagement at their opposed ends by biasing means in the form of a compression spring 38. This compression spring 38 acts between the cover 32 and a shoulder 40 of insulating material clamped to the movable contact 12 for providing a force that urges the contact 12 in a downward closing direction. Opening of the circuit breaker is effected by driving the movable contact 12 in an upward direction away from the other contact 14 against the bias of the closing spring 38.

In a preferred embodiment of our invention, the lower rod contact 14, as well as the upper rod contact 12, is mounted for motion in a direction parallel to its longitudinal axis. The lower contact 14 is normally maintained in its position of FIG. 1 by biasing means in the form of a compression spring 37 disposed beneath a perforated abutment 39 secured to the lower end of the rod contact 14. This spring 37 bears at its upper end on the abutment 39 and at its lower end, on a stationary ring 41 secured to the bottom of the tank 30 and, thus, always urges the lower contact 14 in an upward direction. When the circuit breaker is in its closed position of FIG. 1, the position of the lower contact 14 is determined by a stationary shoulder 39a against which the abutment 39 abuts and is maintained by the compression spring 37.

For enclosing the arcing gap that is established between the ends of contacts 12 and 14 when the contact 12 is driven upwardly during a circuit-opening operation, an arcing enclosure 42 suitably fixed to the tank 30, as by screws 42a, is provided. This arcing enclosure 42 comprises a relatively thick-walled outer cylinder 43 made preferably of a high strength non-magnetic metal, such as a non-magnetic steel. Within this outer cylinder 43 is a lining 45 of insulating material, preferably made in several parts to facilitate assembly and manufacture. The walls of the enclosure 42 are of sufficient thickness and strength to preveint significant expansion thereof by the pressure developed internally thereof. In the illustrated embodiment of the invention, this lining 45 is shown clamped in place against an internal shoulder on the outer cylinder 43 by means of a heavy insulating nut 48. The nut 48 has external threads that mesh with suitable internal threads formed in the cylinder 43. This composite enclosure 42 defines internally thereof an arcing chamber 49 in which arcing between the contacts takes place during a circuit interrupting operation. As will soon be pointed out in greater detail, the arcing enclosure 42 serves to confine the high pressure developed in the arcing chamber during arcing. The insulating lining 45 protects the metallic outer cylinder 43 from the arc by preventing the arc from contacting the cylinder 43.

The two rod contacts 12 and 14 are slidably mounted within the arcing enclosure 42 by means of suitable slide bearings closely surrounding the rod contacts at locations spaced from their abutting ends. The slide bearing for the lower rod contact 14 is formed in the insulating lining 45 at 50, and the slide bearing for the upper rod contact 12 is formed in the nut 48 at 52. Since the slide bearings 50, 52 and the lining 45 are of electrical insulating material, it will be apparent that these parts serve the additional function of insulating the two contacts from each other and from the metallic cylinder 43 when the contacts are in their separated, or opened, position.

For reacting with the arc to provide the pressures and fluid flow necessary for quick extinction, a suitable arc-extinguishing liquid such as oil, water, or carbon tetrachloride is provided. The entire arcing enclosure 42 is submerged in this liquid, and the liquid normally fills the arcing chamber 49 around the abutting ends of the contacts 12 and 14 so as to be available for immediate reaction with the arc. Because the decomposition products of carbon tetrachloride produced by arcing can be readily removed by suitable gathering agents such as soda lime and alumina, carbon tetrachloride is preferred to oil or water in a sealed unit such as shown in FIG. 1. These gathering agents are suitably incorporated (in a manner not shown) in the space above the liquid level so as to be available for moderately rapid reaction with the decomposition products. If some other arc-extinguishing liquid is employed which decomposes into gases that will not readily react with available gathering agents, then suitable vents or other conventional means should be provided for removal of such gases.

For directing the flow of arc-extinguishing fluid through the region between the contacts 12 and 14 during interruption, an exhaust passage 60 extending longitudinally of the rod contact 12 is provided. This exhaust passage 60 extends from the arcing chamber 49 to an expansion chamber 62 surrounding the rod contact 12 outside of the arcing chamber 49. The exhaust passage 60 may be thought of as leading from the arcing chamber longitudinally of the arcing gap or in a direction generally parallel to the direction of motion of contact 12. Preferably the exhaust passage 60 is provided with a pair of diametrically opposed exhaust ports 64 at its upper end leading to the expansion chamber 62. The walls of the expansion chamber 62 are defined by a recess formed in nut 48 and by a movable piston 65 secured to the rod contact 12. The recess in the nut 48, in effect, constitutes a cylinder in which the piston 65 is slidable. When the contacts 12 and 14 are in their closed position of FIG. 1, the piston 65 telescopes into the cylinder a short distance so as to block the egress of fluid from the expansion chamber 62 until the piston 65 is moved out of the cylinder. Thus, when fluid is forced through the exhaust passage 60 into the expansion chamber 62, it exerts an upward contact-opening force on the piston 65. Since the pressurized fluid is prevented from leaving the expansion chamber 62 until the piston 65 is moved upwardly a short distance, it will be apparent that the piston 65, constitutes a severe restriction to flow through the exhaust passage 60 which accelerates pressure build-up in the arcing chamber 49.

As was pointed out hereinabove, one of the objects of our invention is to interrupt short-circuit currents with a current-limiting action that limits the maximum let-through current to a considerably lower value than the maximum available current. In order to achieve this result, it is essential that the interrupter first sense the presence of the short circuit and then respond to the short circuit by opening its contacts and building up an arc voltage approaching line voltage, all within an extremely short period, considerably shorter in duration than the time required for the current to build up to its maximum available value. In a conventional 60 cycle alternating current circuit, only about two milliseconds are available for the interrupter to complete this series of operations.

For sensing the presence of a short circuit and then initiating contact separation in response to the short circuit, all within the extremely short time available to produce current-limiting action, the disclosed interrupter relies upon "popping" apart of the contacts. In this regard, there is developed in the abutting regions of the contacts a force, dependent upon the magnitude of the current flowing through the contacts, which acts to drive the contacts apart under high current conditions. One component of this force is a magnetic repulsion force between the contacts produced by the current distribution in the abutting regions of the contacts. The other component is a contact-separating force resulting from local heating at the point of contact that produces vaporization that, in turn, produces pressures tending to separate the contacts. These two components of contact-separating force increase sharply as the current increases; and in the disclosed interrupter the sum of these contact-separating force components exceeds the biasing force of the spring 38 at values of short circuit current well within the interrupting rating of the circuit breaker. When this total contact-separating force exceeds the opposing force of the spring 38, the contacts separate or "pop" apart. The sum of these force components tending to drive the contacts apart at a given current is referred to hereinafter as the contact-popping force.

To effectively utilize this popping effect to drive the movable contact in its normal opening direction, it is important that the contacts be of the butt-type rather than of a sliding-type. In addition, by using butt-type contacts, an arc is drawn as soon as initial contact motion occurs. No delay is required to allow one contact to slide over another before an arcing gap is established, as would be the case with sliding-type contacts. Thus, it will be apparent that an important factor contributing to the desired high speed establishment of an arcing gap is that the contacts are of the butt-type and are capable of lengthening the arc from the instant contact motion begins.

Immediately after the contacts separate in response to the above-described popping action, an arc is drawn between the contacts, and this arc immediately vaporizes more surrounding liquid and thus creates additional pressure tending to force the contacts open. The arcing chamber, being essentially imperforate except for the exhaust passage 60, confines this pressure and thus tends to accelerate additional pressure build-up. Not only does this high pressure act directly on the lower end of the movable contact 12 to accelerate the contact toward open position, but it also acts upon piston 65 at the upper end of the contact 12 to provide still additional force for accelerating the movable contact 12 toward open position. In this regard, the high pressures developed within the arcing chamber 49 force fluid through the exhaust passage 60, thus pressurizing the fluid in expansion chamber 62. Since the piston 65 telescopes into the cylinder 48 forming the peripheral wall of the expansion chamber and since there is little clearance between the piston 65 and the cylinder 48, the increased pressure in the expansion chamber is transmitted to the piston 65, thus producing additional force for accelerating the movable contact toward its fully open position.

The piston 65 serves not only as a means for magnifying the contact accelerating force by providing extra area on which the arcing pressure can act, but it serves also to accelerate the pressure build-up within the arcing chamber 49 since it severely restricts the flow of fluid through exhaust passage 60 until the piston emerges from its surrounding cylinder 48. Since this passage 60 is the only significant exhaust passage leading from the otherwise imperforate and virtually inexpansible arcing chamber 49, extremely high pressures are built up within the arcing chamber 49 while the exhaust passage is maintained restricted by the piston. The fact that these pressures are extremely high, e.g., on the order of 500 to 1000 p.s.i. for maximum let-through currents of 50,000 amperes, contributes in an important manner to the high speeds at which contact separation occurs.

It is to be noted, with regard to the interval in which the piston is still within the cylinder 48, that some flow, though limited, is even then taking place through the flow passage 60. Although this limited flow has only a moderate effect in reducing the rate of pressure build-up within the arcing chamber 49, it does serve the important purpose of accelerating arc-cooling and, in this way, accelerating the build-up of arc voltage, as will appear more clearly hereinafter.

As the piston 65 emerges from its surrounding cylinder 48, it no longer severely restricts flow through the exhaust passage 60. Accordingly, the high pressure developed in the arcing chamber 49 then becomes free to drive fluid at a much higher rate of flow from the arcing chamber 59 through the exhaust passage 60 via the paths indicated by the arrows 69 of FIG. 2. This blast of fluid cuts radially and axially across the arcing region, turbulently mixing with the arc plasma and subjecting the arc to an intense cooling action. This combined mixing and cooling action rapidly builds up an arc voltage that approaches the instantaneous line voltage, and this high arc voltage limits the maximum let-through current to a value considerably lower than the maximum available current. After the current through the breaker has reached its peak, or maximum let-through, value, the arc voltage is able to quickly force the current down toward zero, with the zero current point being reached considerably ahead of the natural current zero. No reignition of the arc occurs thereafter so that interruption is consistently completed by the time the first current zero is reached.

The pattern of flow that results from locating the exhaust passage 60 in its disclosed posiiton, i.e., leading from the arcing gap through the contact 12 in a direction generally parallel to the direction of movement of the contact, is exceptionally effective in producing intense cooling of the arc because the cooling fluid is able to envelope the arc about substantially its entire periphery. In other words, the flow of cooling fluid is radially-inward about substantially the entire periphery of the arcing gap. The fact that the cooling fluid envelopes the arc about its entire periphery is also advantageous from the standpoint of preventing radially-outward expansion of the arcing products and of maintaining the arc centered in the arcing chamber 49 and out of direct contact with the walls of the arcing chamber. This enables us to use a smaller arcing chamber than would be otherwise required without exposing the walls of the chamber to damaging arcing. The smaller this arcing chamber, the more easily it can be made strong enough to safely withstand the high pressures developed during interruption.

The current-limiting action described hereinabove is graphically illustrated in FIG. 3, where the available current is depicted in dotted lines, and the actual current is depicted in solid lines. When a fault occurs at a point A, the current flowing through the breaker will increase extremely rapidly toward an available peak value that may be hundreds of times greater than the normal continuous current through the breaker. Due to the contact-popping action described hereinabove, the breaker will part its contacts in response to this sudden rise in current at a point B and will immediately begin developing an arc voltage that limits the actual current to a maximum let-through value that is considerably less than the maximum available value depicted on the dotted line curve. The current is thereafter driven down to zero considerably ahead of the natural current zero occurring at point C.

Figure 2:
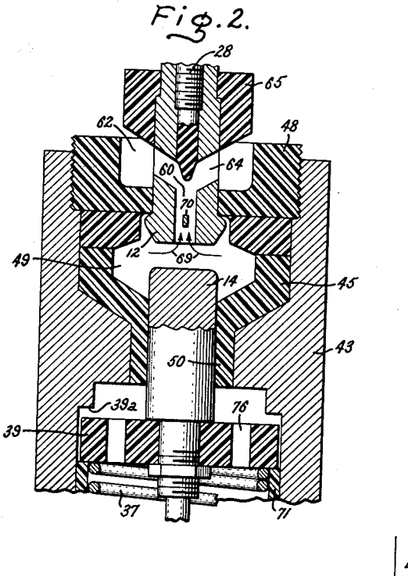
FIG. 2 is a cross-sectional view of a portion of FIG. 1 showing the circuit breaker in its fully open position.
Figure 3:
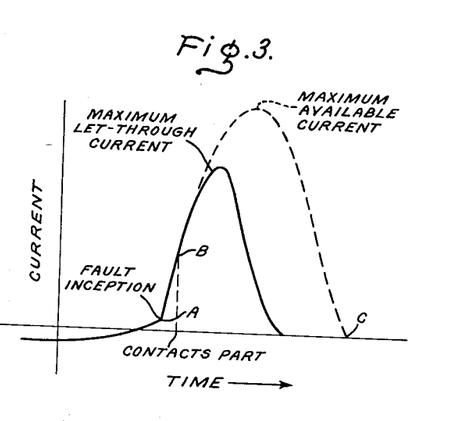
FIG. 3 is a diagrammatic representation of certain electrical relationships occurring during an interrupting operation.

Actual interrupting tests made with an interrupter corresponding in design to that of FIGS. 1 and 2 have demonstrated that this interrupter can consistently interrupt short-circuit currents with current-limiting action such as depicted in FIG. 3. For example, in a 600 volt alternating-current circuit, the interrupter has interrupted currents having a maximum available value of between 35,000 and 100,000 amperes with such current-limiting action. These figures are given merely by way of example, it being understood that the interrupter can be applied to lower voltage circuits and, with minor modifications, to higher voltage circuits. In the above-mentioned tests made on a 600 volt circuit, only short contact separations, less than ¼ inch, were required to interrupt the circuit with current-limiting action.

For limiting the length of the arc during interruption, a probe 70, preferably of tungsten, is provided in the center of the exhaust passage 60. The above-described blast action that occurs through the exhaust passage 60 during interruption forces the upper terminal of the arc into the exhaust passage and on to the probe 70 where it is maintained during the remainder of the interrupting operation. The increased arc length that results from driving the upper arc terminal on to the probe 70 contributes to the development of increased arc voltage.

During heavy current interruptions, the lower contact 14, as well as the upper contact 12, is moved in a contact-separating direction. In this regard, the pressures generated inside the arcing chamber by a heavy current arc act on the exposed surface of contact 14 to drive this contact rapidly downward against its biasing spring 37 until the abutment 39 engages a stop 71. The relatively large openings 76 provided in the abutment 39 permit this downward motion to occur without significant retardation from the liquid beneath the abutment. This downward motion of the lower contact 14 contributes to increased arc lengths, and, hence, increased arc voltages and thus facilitates the current-limiting action of the breaker. It should be understood that although the lower contact 14 is moved downward in this manner during interruption, it is not necessary that the force of the spring 37 be overcome to initiate popping apart of the contacts. Only the upper spring 38, which is considerably lighter than the lower spring 37, need be overcome to initiate contact separation. Most of the forces for driving the lower contact become available immediately after contact-separation due to the pressures generated by the arc that results from contact-separation. Although the lower contact is preferably made movable, as shown in FIG. 1, it is to be understood that the invention in its broader aspects comprehends an interrupter in which this contact is stationary.

Figure 2A:
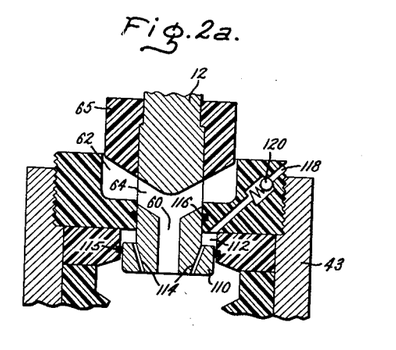
FIG. 2a illustrates a slightly modified form of the circuit breaker shown in FIGS. 1 and 2.

In some cases it may be desirable to provide for even more complete mixing between the arc plasma and the arc-extinguishing fluid than occurs with the interrupter of FIG. 1. This can be accomplished by forcing liquid jets into the arc plasma, thereby increasing the turbulence at the interface of the plasma and the surrounding liquid, thus intensifying the desired mixing and cooling action. FIG. 2a illustrates means for introducing these jets into the arc plasma without interfering with the predominant flow pattern of the arc-extinguishing fluid, i.e., radially inward of the arcing gap about substantially its entire periphery. In FIG. 2a, the enlargment 110 at the lower end of the contact 12 telescopes into a cavity 112 that surrounds it, and the liquid trapped behind the enlargement 110 is forced through spaced passages 114 extending through the enlargement into the arcing region. Preferably, suitable seals 115 and 116 are provided about the enlargement and the shank of the contact to prevent liquid from bypassing the jet passages 114 when the enlargement moves into the cavity. A supply passage 118 leading into the cavity 112 permits the liquid supply therein to be replenished when the contact is returned to closed position. A suitable check valve 120 is provided in this passage 118 to prevent liquid from being forced out of the cavity 112 via the supply passage during contact-opening movement.

Figure 5:
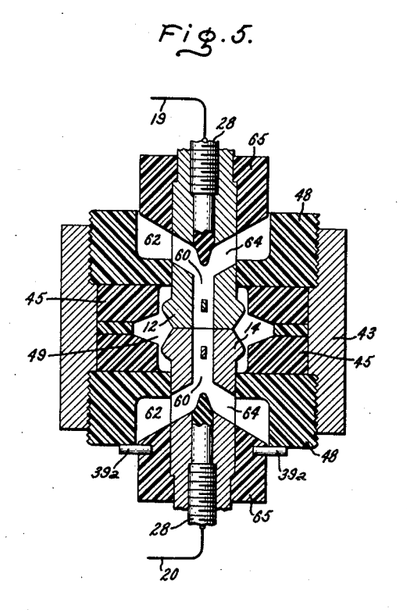
FIG. 5 is a cross-sectional view illustrating still another circuit breaker embodying our invention.

Although in FIG. 1 only the upper contact 12 has been provided with an exhaust passage, it is to be understood that the lower contact as well may be provided with an exhaust passage. Such a modification is illustrated in FIG. 5, where the lower contact 14 is shown provided with an exhaust passage 60 corresponding to that provided in the upper contact. This lower exhaust passage 60 leads from the arcing chamber 49 in a direction generally parallel to the direction of motion of the contact 14 and terminates at its lower end in a lower expansion chamber 62. The piston 65 secured to the lower contact 14 telescopes within the cylindrical walls of the lower expansion chamber 62 and serves substantially the same purpose as the piston 65 secured to the upper contact 12. In this regard, the lower piston serves the dual function of (1) magnifying the contact accelerating forces by providing extra area on which the arcing pressure can act and (2) accelerating the pressure build-up within the arcing chamber 49 by severely restricting the flow of fluid through exhaust passage 60 until the piston 65 emerges from its surrounding cylinder.

Although the presence of the additional exhaust passage 60 slightly lessens the rate at which pressure builds up within the arcing chamber 49, this effect is compensated for by the increased cooling that results from flow at both terminals of the arc when two exhaust passages 60 are present. Moreover, the piston 65 that is connected to the lower contact 14 assures that the rate of pressure build-up in the arcing chamber 49 will be only slightly lessened inasmuch as the lower piston 65 severely restricts the flow of fluid through the lower exhaust passage 60 until the piston 65 emerges from its surrounding cylinder.

Figure 4:
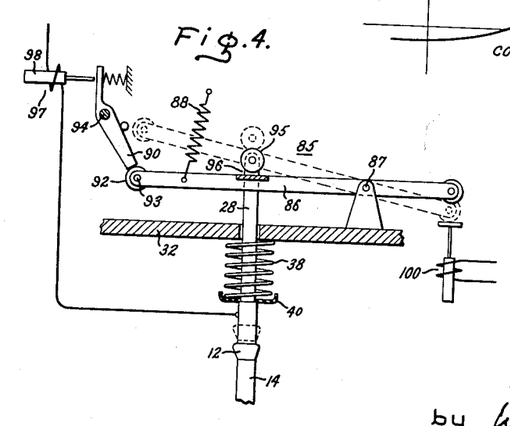
FIG. 4 schematically illustrates a mechanism for operating the circuit breaker under certain conditions.

For opening the circuit breaker of FIG. 1 or of FIG. 5 either manually or in response to predetermined electrical conditions, such as overcurrents insufficient in magnitude to initiate opening through popping of the contacts, each of these breakers is provided with an operating mechanism 85 schematically depicted in FIG. 4. This operating mechanism 85 comprises an opening lever 86 that is pivotally supported on a stationary pivot 87 and is biased in a clockwise opening direction about the pivot 87 by means of an opening spring 88. When the circuit breaker is closed, the opening lever is held in its closed position of FIG. 4 by means of a conventional trip-latch 90. This trip-latch 90 engages a latch-roller 92 that is rotatably mounted on the opening lever 86 at its outer end by means of a shaft 93 fixed to the opening lever.

When the trip-latch 90 is rotated in a clockwise direction about its stationary pivot 94, the restraint of the latch 90 is removed from the opening lever 86, and the opening spring 88 becomes free to drive the opening lever 86 in a clockwise opening direction toward its dotted line open position. This clockwise opening motion of the opening lever 86 is transmitted to the rod contact 12 by means of a roller 95 coupled to the insulating operating rod 28 and adapted to be engaged by the opening lever 86. The coupling between the lever 86 and the roller might be termed an overrunning coupling inasmuch as the roller 95 is free to move independently of the lever 86 when driven at a higher speed than lever 86, as during heavy overcurrent interruptions. During low current interruptions, however, there are insufficient forces acting on the movable contact 12 to produce such overrunning action; and, accordingly, when the opening lever 86 moves in a clockwise opening direction, it lifts the opening rod 28 and connected contact 12 to effect opening of the circuit breaker. The final position of the parts after this opening operation is depicted in dotted lines in FIG. 4. The opening spring 88 is of such a size that, when released, it can apply a substantially greater force to the operating rod 28 than the opposing force applied by the closing spring 38. Accordingly, the opening spring, in driving the opening lever 86 clockwise, readily overcomes the opposition of the closing spring 38.

For preventing the opening spring 88 from influencing the pressure exerted by the closing spring 38 on the contacts 12, 14 when the breaker is in its normal closed position, a slight clearance is provided at 96 between the roller 95 and the portion of the operating lever 86 intended to engage the roller 95. Thus, the opening spring applies no opening force to the contact operating rod 28 so long as the opening lever 86 is in its normal closed position of FIG. 4.

The above-described tripping of the trip latch 90 is effected by suitable overcurrent-sensitive means such as a solenoid 97 connected in series with the power circuit through circuit breaker. Whenever the current through this power circuit exceeds a predetermined value, the solenoid responds by driving its armature 98 to the right to release the latch 90 and permit the spring 88 to open the circuit breaker.

For heavy overcurrents, the contact-opening forces developed by popping and by arc-generated pressures act at such high speed that they force the upper contact 12 upwardly away from the other contact 14 considerably ahead of the instant that the solenoid 97 is able to trip the latch 90 and thus initiate opening movement of the opening member 86. The solenoid 97 is so designed, however, that eventually it will trip the latch 90 for all currents that produce popping apart of the contacts, even though the power circuit might be interrupted at an early stage by the circuit breaker. When the latch 90 is thus tripped, the opening lever 86 moves clockwise about its pivot 87 under the influence of opening spring 88, engaging the roller 95 in the fully open position of the circuit breaker to hold the contact 12 in is uppermost position of FIG. 4. The closing spring 38, being lighter than the opening spring 88, is thus rendered incapable of automatically reclosing the circuit breaker when the pressure in the arcing chamber 49 decays. It will therefore be apparent that the opening lever 86 and opening spring 88 serve to hold the contacts open after each interrupting operation, thus maintaining the circuit through the breaker open until the breaker is intentionally reclosed.

Reclosing of the circuit breaker is effected by returning the lever 86 from its dotted line fully-open position of FIG. 4 to its solid line position of FIG. 4. This can be done by any suitable closing means, such as the solenoid 100 depicted in FIG. 4. Should a fault be present on the power circuit when the contact 12 reaches its closed position, the contact can immediately reopen without restraint from the opening lever 86 or the closing solenoid 100 since the contact 12 is free to move into its open position independently of the opening lever 86. Thus, for overcurrents that are high enough to cause the contacts to open through popping, the mechanism 85 is mechanically trip-free.

It is to be noted that the presence of operating mechanism 85 in no way interferes with the ability of the movable contact 12 to open at high speed in response to those overcurrents which produce popping of the contacts. In this regard, due to the overrunning coupling between opening lever 86 and roller 95, the contact 12 is free to move into its open position independently of the opening lever 86 and the rest of the operating mechanism 85, thus avoiding the necessty of overcoming the inertia of the relatively massive operating mechanism 85 in order to effect opening. Only the inertia of relatively light contact 12 and operating rod 28 need be overcome, and this is so small that it does not unduly impede opening motion. The fact that the interrupter is able to interrupt the circuit in the desired manner, i.e., with current limiting action, with a very short contact separation, for example, less than one-fourth inch for 600 volt circuit, is another factor contributing to the high speed interrupting ability of our interrupter.

During the above-described closing action, the piston 65 serves an additional desirable function. More specifically, it retards the moving contact 12 just ahead of the point at which it engages the other contact 14, and, in this way, lessens the tendency of the contacts to bounce apart under the impact of closing. This retarding action results from entry of the piston 65 into the cylinder 48 at the end of the closing stroke. Since there is little clearance around the periphery of the piston 65, a substantial retarding force is developed at the end of the closing stroke just prior to the contact-make point.

In FIG. 1, assurance that the piston 65 will consistently enter its cylinder 48 at the end of a closing stroke is provided by locating the stop 39a for the lower contact 14 in such a piston that the upper contact 12 must always return to at least its position of FIG. 1 before it can engage the lower contact. In other words, the stop 39a determines the uppermost position of lower contact 14, and this uppermost position is so located that the piston 65 on the upper contact 12 must enter its cylinder 48 before the upper contact can engage the lower contact. Because the lower contact 14 returns to its closed position first under the influence of heavier spring 37, it will be apparent that the upper contact is always the moving contact on actual closing, and thus the piston 65 on the upper contact 12 is always capable of acting as a dashpot piston just before the contact-make point.

A similar stop is provided in FIG. 5 to determine the uppermost position of the lower contact 14. This stop comprises one or more pins 39a fixed to the lower piston 65 to engage the nut 48 at the uppermost position of lower contact 14.

Figure 6:
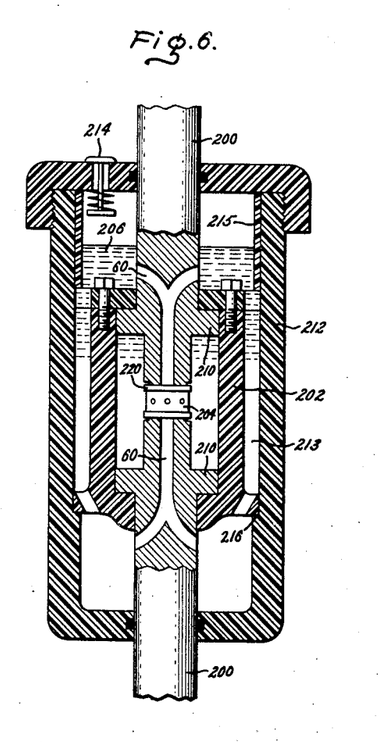
FIG. 6 is a cross-sectional view illustrating a fuse embodying certain aspects of our invention.
Figure 7:
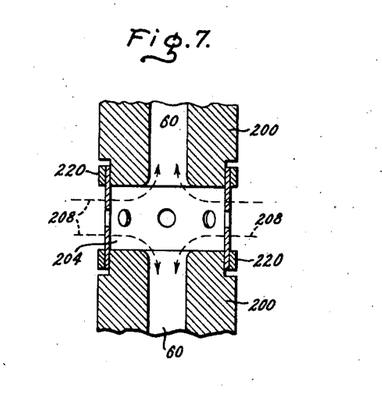
FIGURE 7 is an enlarged cross-sectional view of the fuse shown in FIG. 6.

Although the present invention is primarily concerned with circuit breakers, certain of its principles have application to fuses as well. An example of a fuse employing such principles is illustrated in FIG. 6. This fuse of FIG. 6 comprises a pair of conductive, rod-like electrodes 200 projecting into an arching enclosure 202 of high-strength insulating material through opposite ends of the enclosure. The inner ends of the electrodes 200 are physically spaced-apart but normally are electrically connected together by a short fusible link 204. This fusible link 204 is adapted to vaporize in response to heavy over-currents to establish an arc between the inner ends of the electrodes 200.

For directing the arcing products from the arcing region between the electrodes, each electrode 200 is provided with a longitudinally-extending exhaust passage 60. Each of these exhaust passages 60 leads from the arching region in a direction longitudinally thereof to a region outside of the enclosure 202. The arcing enclosure 202 is completely filled with arc-extinguishing liquid 206 which is adapted to react with the arc formed upon vaporization of fusible link 204. The reaction between the arc and the liquid 206 creates a high pressure within arcing enclosure 202 that forces fluid at a high rate of flow through the exhaust passage 60 via paths extending radially across the arcing gap about substantially its entire periphery, as indicated by dotted arrows 208. The arcing enclosure 202 is substantially imperforate except for exhaust passages 60 so that substantially all fluid leaving the enclosure is required to do so via the arcing gap and the centrally-located exhaust passages 60. This produces substantially the same flow pattern as in the interrupter of FIG. 1 and thus maintains the arc generally centered in the manner described in connection with FIG. 1. Since the electrodes 200 are spaced apart at their inner ends, an arcing gap of adequate length is established immediately upon vaporization of the fusible element 204, and no special means is therefore required for moving the electrodes apart at high speed as in FIG. 1. The described flow pattern and high rate of flow coupled with the high speed establishment of an arcing gap of appreciable length results in the build-up of arc voltage at a high enough rate to produce current-limiting action such as described in connection with FIG. 3.

Each of the electrodes 200 of FIG. 6 is preferably provided with a shoulder 210 that is suitably secured to one of the end walls of the arcing enclosure 202 to provide means for transmitting the forces produced by interruption to the enclosure. The enclosure 202 is shown surrounded by a suitable insulating casing 212 that is filled with the arc-extinguishing liquid 206 to a level well above the exhaust ports of the top exhaust passage 60. The arcing products are exhausted into the interior of this casing 212 upon interruption. A gas space of adequate volume is left above the liquid level to limit the maximum pressure levels developed within the casing 212 during interruption. The arcing products from the top exhaust passage 60 vent directly into this gas space, whereas those from the bottom exhaust passage 60 are directed into the gas space through relatively large passages 213 extending from beneath the arcing enclosure 202 to above it about its outer periphery.

A suitable pressure-responsive vent 214 is preferably provided to act as a safety valve that opens to prevent excess pressures from being developed within casing 212. A suitable sleeve 215 is provided between the top of the casing 212 and the arcing enclosure 202 to hold the arcing enclosure in position against an internal shoulder 216 in the casing.

The fusible link 204 is preferably formed from a perforated strip of suitable metal rolled into a generally cylindrical form. This generally cylindrical link can be secured in place between the electrodes 200 in any suitable manner, but we prefer to clamp it about the ends of the electrodes 200 by means including split rings 220.

A special advantage of the disclosed liquid-type fuse is that the fuse link 204 can be made considerably shorter than the fuse link of a sand-filled fuse of the same voltage rating. This is so because, during and immediately after interruption, the pressurized fluid in our fuse has greater dielectric strength than the molten sand present in a sand-filled fuse. Since our fuse link is short and since it is efficiently cooled during normal current conditions by the relatively high rate of heat flow through the massive electrodes 200 and the surrounding liquid, its cross-section can be considerably smaller than that of the fuse link of a sand-filled fuse without resulting in any greater temperatures during normal currents. This smaller cross-section enables the link to melt and vaporize at an extremely high speed in response to short circuit currents, thus further contributing to the current-limiing ability of our fuse.

It is to be noted that our fuse can be made reusable after an interruption simply by replacing the link 204. The other parts of the fuse remain intact and can be readily disassembled to permit such link-replacement.

While we have shown and described particular embodiments of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. An electric circuit breaker comprising a pair of relatively movable butt-type contacts separable to establish an arcing gap across which an arc is drawn, an arcing chamber enclosing said arcing gap, said arcing chamber being substantially completely filled with arc-extinguishing liquid when said contacts are in engagement, means for biasing one of said contacts into engagement with the other with a force less than the total force tending to pop apart said contacts during heavy overcurrents through said contacts within the interrupting rating of the circuit breaker so that said contacts separate automatically in response to said overcurrents, exhaust passage means confined to said contacts and leading from said arcing gap in a direction longitudinally thereof through at least one of said contacts, said arcing chamber being substantially imperforate except for said exhaust passage means so that the pressures generated by arcing force fluid into said exhaust passage means via paths extending radially inwardly about the periphery of said arcing gap, means for severely restricting flow through said exhaust passage means from the time said contacts first part until a predetermined length of gap has been established whereby the arc develops relatively high pressures that act to continue separation of said one contact from said other contact, means for opening said exhaust passage means when said predetermined length of gap has been established so that said high pressures can then drive fluid through said arcing gap and said exhaust passage means at an increased rate of flow.

2. The circuit breaker of claim 1 in which both of said contacts are movable in a contact-separating direction in response to the pressures developed within said arcing chamber during arcing.

3. The circuit breaker of claim 1 in which both of said contacts are movable in a contact-separating direction in response to the pressures developed within said arcing chamber during arcing, and in which additional biasing means is provided for returning said other contact to its closed position immediately after an interrupting operation.

4. The circuit breaker of claim 1 in combination with current-sensitive means for initiating separation of said one contact from said other contact in response to currents of a magnitude insufficient to pop apart said contacts.

5. The circuit breaker of claim 1 in combination with current-sensitive means for initiating separation of said one contact from said other contact in response to predetermined currents of a magnitude insufficient to pop apart said contacts, said current-sensitive means comprising: an opening member, means for moving said opening member in a contact-separating direction upon the occurrence of said predetermined currents, and an overrunning coupling between said opening member and said one contact that is capable of transmitting contact-separating force from said opening member to said one-contact but is incapable of transmitting force from said one contact to said opening member when said one contact moves toward open position ahead of said opening member.

6. An electric circuit breaker comprising a pair of relatively movable butt-type contacts separable to establish an arcing gap across which an arc is drawn, an arcing chamber enclosing said arcing gap, said arcing chamber being substantially completely filled with arc-extinguishing liquid when said contacts are in engagement, means for biasing one of said contacts into engagement with the other with a force less than the total force tending to pop apart said contacts during heavy overcurrents through said contacts within the interrupting rating of the circuit breaker so that said contacts separate automatically in response to said overcurrents, exhaust passage means confined to said contacts and leading from said arcing gap through at least one of said contacts in the general direction of motion of its corresponding contact, said arcing chamber being substantially imperforate except for said exhaust passage means so that the pressures generated by arcing force fluid into said exhaust passage means via paths extending radially inwardly about the periphery of said arcing gap, means for severely restricting flow through said exhaust passage means during initial contact-separation comprising a piston fixed to said one contact outside of said arcing chamber, an expansion chamber communicating with said exhaust passage means and with said piston so that fluid forced through said exhaust passage means into said expansion chamber increases the pressure on said piston and tends to produce a contact-separating force on said piston, said piston blocking the egress of fluid from said expansion chamber until a predetermined contact-separation has occured so as to accelerate pressure build-up in said arcing chamber during said predetermined contact-separation, the pressures developed in said arcing chamber acting to accelerate contact-separation and to drive fluid through said exhaust passage means at an increased rate of flow after said predetermined contact-separation has occurred.

7. The circuit breaker of claim 6 in which both of said contacts are movable in a contact-separating direction in response to the pressure developed within said arcing chamber during arcing; in which biasing means is provided for returning said other contact to its closed position immediately after an interrupting operation; and in which means is provided for limiting the return movement of said other contact to such an extent that reengagement of said contacts will cause said piston to be located in a position to block the egress of fluid from said expansion chamber when said contacts are in engagement.

8. An electric circuit breaker comprising a pair of relatively movable butt-type contacts separable to establish an arcing gap across which an arc is drawn, an arcing chamber enclosing said arcing gap, said arcing chamber being substantially completely filled with arc-extinguishing liquid when said contacts are in engagement, means for biasing said contacts into engagement with each other with a force less than the total force tending to pop apart said contacts during heavy overcurrents through said contacts within the interrupting rating of the circuit breaker so that said contacts separate automatically in response to said overcurrents, exhaust passages extending through both of said contacts and leading from said arcing gap in the general direction of motion of its corresponding contact, said arcing chamber being substantially imperforate except for said exhaust passages so that the pressures generated by arcing force fluid into said exhaust passages via paths extending radially inwardly about the periphery of said arcing gap, means for severely restricting flow through said exhaust passages from the time said contacts first part until a predetermined length of gap has been established whereby the arc develops relatively high pressures that act to continue separation of said contacts, means for opening said exhaust passages when said predetermined length of gap has been established so that said high pressures can then drive fluid through said arcing gap and exhaust passages at an increased rate of flow.

9. An electric circuit breaker comprising a pair of relatively movable butt-type contacts separable to establish an arcing gap across which an arc is drawn, an arcing chamber enclosing said arcing gap, said arcing chamber being substantially completely filled with arc-extinguishing liquid when said contacts are in engagement, means for biasing said contacts into engagement with each other with a force less than the total force tending to pop apart said contacts during heavy overcurrents through said contacts within the interrupting rating of the circuit breaker so that said contacts separate automatically in response to said overcurrents, exhaust passages extending through both of said contacts and leading from said arcing gap in the general direction of motion of its corresponding contact, said arcing chamber being substantially imperforate except for said exhaust passages so that the pressures generated by arcing force fluid into said exhaust passages via paths extending radially inwardly about the periphery of said arcing gap, means for severely restricting flow through at least one of said exhaust passages from the time said contacts first part until a predetermined length of gap has been established whereby the arc develops relatively high pressures that act to continue separation of said contacts, means for opening said one exhaust passage when said predetermined length of gap has been established so that said high pressures can then drive fluid through said arcing gap and said one of exhaust passages at an increased rate of flow.

10. The circuit breaker of claim 9 in which the means for severely restricting flow through said one exhaust passage comprises a piston located outside of said arcing chamber and fixed to the contact through which said one exhaust passage extends, an expansion chamber communicating with said one exhaust passage and said piston so that fluid forces through said one exhaust passage increases the pressure on said piston and tends to produce a contact-separating force on said piston, said piston blocking the egress of fluid from said expansion chamber until said predetermined length of gap has been established so as to accelerate pressure build-up in said arcing chamber during establishment of said predetermined length of gap.

11. An electric circuit breaker comprising a pair of relatively movable butt-type contacts separable to establish an arcing gap across which an arc is drawn, an arcing chamber enclosing said arcing gap, said arcing chamber being substantially completely filled with arc-extinguishing liquid when said contacts are in engagement, means for biasing said contacts into engagement with each other with a force less than the total force tending to pop apart said contacts during heavy overcurrents through said contacts within the interrupting rating of the second breaker so that said contacts separate automatically in response to said overcurrents, exhaust passages extending through both of said contacts and leading from said arcing gap in the general direction of motion of its corresponding contact, said arcing chamber being substantially imperforate except for said exhaust passages so that the pressures generated by arcing force fluid into said exhaust passages via paths extending radially inwardly about the periphery of said arcing gap, means for severely restricting flow through said exhaust passages during initial contact separation comprising a piston fixed to one of said contacts outside of said arcing chamber, an expansion chamber communicating with one of said exhaust passages and with said piston so that fluid forced through said one exhaust passage into said expansion chamber increases the pressure on said piston and tends to produce a contact-separating force on said piston, said piston blocking the egress of fluid from said expansion chamber until a predetermined contact-separation has occurred so as to accelerate pressure build-up in said arcing chamber during said predetermined contact separation, the pressures developed in said arcing chamber acting to accelerate contact-separation and to drive fluid through said one exhaust passage at an increased rate of flow after said predetermined contact-separation has occurred.

12. An electric circuit breaker comprising a pair of relatively movable-butt type contacts separable to establish an arcing gap across which an arc is drawn, an arcing chamber enclosing said arcing gap, said arcing chamber being substantially completely filled with arc-extinguishing liquid when said contacts are in engagement, means for initiating separation of one of said contacts from the other in response to overcurrents through the contacts, exhaust passage means confined to said contacts and leading from said arcing gap through at least one of said contacts in the general direction of motion of its corresponding contact, said arcing chamber being substantially imperforate except for said exhaust passage means so that the pressures generated by arcing force fluid into said exhaust passage means via paths extending radially inwardly about the periphery of said arcing gap, means for severely restricting flow through said exhaust passage means from the time said contacts first part until a predetermined length of gap has been established whereby the arc develops relatively high pressures that act to continue separation of said one contact from said other contact, means for opening said exhaust passage means when said predetermined length of gap has been established so that said high pressures can then drive fluid through said arcing gap and said exhaust passage means at an increased rate of flow.

13. An electric circuit breaker comprising a pair of relatively movable-butt type contacts separable to establish an arcing gap across which an arc is drawn, an arcing chamber enclosing said arcing gap, said arcing chamber being substantially completely filled with arc-extinguishing liquid when said contacts are in engagement, means for initiating separation of one of said contacts from the other in response to overcurrents through the contacts, exhaust passage means confined to said contacts leading from said arcing gap through at least one of said contacts in the general direction of motion of its corresponding contact, said arcing chamber being substantially imperforate except for said exhaust passage means so that the pressures generated by arcing force fluid into said exhaust passage means via paths extending radially inwardly about the periphery of said arcing gap, a piston fixed to said one contact outside of said arcing chamber, an expansion chamber communicating with said exhaust passage means and with said piston so that fluid forced through said exhaust passage means into said expansion chamber increases the pressure on said piston and tends to produce a contact-separating force on said piston, said piston blocking the egress of fluid from said expansion chamber until a predetermined contact-separation has occurred so as to accelerate pressure build-up in said arcing chamber during said predetermined contact-separation, the pressures developed in said arcing chamber acting to accelerate contact-separation and to drive fluid through said exhaust passage means at an increased rate of flow after said predetermined contact-separation has occurred.

14. An electric circuit breaker comprising a pair of relatively movable butt-type contacts separable to establish an arcing gap across which an arc is drawn, first current-sensitive means responsive to overcurrents above a predetermined value and within the interrupting rating of said circuit breaker for initiating separation of one of said contacts from the other contact, an arcing chamber containing liquid surrounding said arcing gap for reacting with said arc to generate high pressures, means for causing said high pressure to drive said one contact at high speed away from said other contact once said arc has been initiated, said arcing chamber being substantially inexpansible except insofar as the volume thereof is increased by contact separation, said arcing chamber being substantially completely filled with said liquid when said contacts are in engagement and all exhaust from said arcing chamber being severely restricted during initial contact separation, second current-sensitive means responsive to overcurrents less than said predetermined value for initiating separation of said one contact from said other contact, said second current-sensitive means comprising: an opening member, means for moving said opening member in a contact-separating direction upon the occurrence of overcurrents less than said predetermined value, and an overrunning coupling between said opening member and said one contact that is capable of transmitting contact-separating force from said opening member to said one contact but is incapable of transmitting force from said one contact to said opening member when said one contact moves toward open position ahead of said opening member.

15. The circuit breaker of claim 14 in which said overrunning coupling permits said one contact to move into its fully-open position independently of said second current-sensitive means so that said one contact can move through its entire opening stroke without being impeded by said second current-sensitive means.

16. An electric circuit breaker comprising a pair of relatively movable butt-type contacts separable to establish an arcing gap across which an arc is drawn, first current-sensitive means responsive to overcurrents through said contacts above a predetermined value and within the interrupting rating of said circuit breaker for initiating separation of one of said contacts from the other, an arcing chamber containing liquid surrounding said arcing gap for reacting with said arc to generate high pressures, means for causing said high pressure to drive said one contact at high speed away from said other contact once said arc has been initiated, said arcing chamber being substantially inexpansible except insofar as the volume thereof is increased by contact separation, said arcing chamber being substantially completely filled with said liquid when said contacts are in engagement and all exhaust from said arcing chamber being severely restricted during initial contact separation, and second current-sensitive means operated by means independent of said contacts in response to overcurrents through said contacts for maintaining said one contact in an open position separated from said other contact after a predetermined interrupting operation.

17. The circuit breaker of claim 16 in which said second current-sensitive means comprises an overrunning coupling that permits said one contact to move into its fully open position independently of said second current-sensitive means so that said one contact can move through its entire opening stroke without being impeded by said second current-sensitive means.

18. An electric circuit breaker comprising a pair of relatively movable butt-type contacts separable to establish an arcing gap across which an arc is drawn, an arcing chamber enclosing said arcing gap, said arcing chamber being substantially completely filled with arc-extinguishing liquid when said contacts are in engagement, means for biasing one of said contacts into engagement with the other with a force less than the total force tending to pop apart said contacts during heavy overcurrents through said contacts within the interrupting rating of the circuit breaker so that said contacts separate automatically in response to said overcurrents, exhaust passage means confined to said contacts and leading from said arcing gap in a direction longitudinally thereof through at least one of said contacts, said arcing chamber being substantially imperforate except for said exhaust passage means so that the pressures generated by arcing force fluid into said exhaust passage means via paths extending radially inwardly about the periphery of said arcing gap, said pressures also acting on said one contact to continue contact-separation after initial contact-separation occurs, a linkage for transmitting circuit-controlling motion to said one contact, and an overrunning coupling between said one contact and said linkage for allowing contact-separation during heavy overcurrents to be initiated and continued independently of said linkage.

19. A current-limiting circuit interrupter comprising a pair of electrodes; means responsive to the flow of fault current through said electrodes for establishing an arcing gap between said electrodes and for developing across said arcing gap an arc voltage on the order of magnitude of the instantaneous line voltage, all within about two milliseconds of fault inception; said electrodes being free of sliding engagement with each other so that any opening movement of the electrodes relative to each other is adapted to lengthen said arcing gap; said means for developing said arc voltage comprising an arcing chamber enclosing said arcing gap, said arcing chamber being completely filled with arc-extinguishing liquid when said arcing gap is first established; exhaust passage means confined to said electrodes and leading from said arcing gap in a direction generally longitudinally of said arcing gap;

said arcing chamber being substantially imperforate except for said exhaust passage means so that the pressures generated by arcing force substantially all fluid exhausted from said arcing chamber during arcing to flow into said exhaust passage means via paths extending radially inwardly about the periphery of said arcing gap; said arcing chamber being substantially inexpansible except insofar as the volume thereof is increased by any electrode movement that might occur.

20. The interrupter of claim 19 in which said circuit interrupter is a fuse comprising a fusible link electrically interconnecting the spaced-apart ends of said electrode when said interrupter is in its closed circuit condition, said fusible link being adapted to vaporize in response to fault currents to establish an arc between said electrodes.

References Cited by the Examiner

UNITED STATES PATENTS

| | | | |
|---|---|---|---|
| 1,530,444 | 3/25 | Trencham | 200—150 |
| 1,827,940 | 10/31 | Greenwood | 200—87 |
| 1,922,862 | 8/33 | Prince | 200—150 |
| 1,934,630 | 11/33 | Rump | 200—150 |
| 2,049,328 | 7/36 | Skeats | 200—150 |
| 2,387,589 | 10/45 | Kesselring et al. | 200—150 |
| 2,781,435 | 2/57 | Heilmann et al. | 200—145 |
| 3,012,118 | 12/61 | Edmunds | 200—116 |

FOREIGN PATENTS

| | | |
|---|---|---|
| 733,665 | 7/32 | France. |
| 1,187,184 | 3/59 | France. |
| 892,469 | 10/53 | Germany. |
| 347,007 | 4/31 | Great Britain. |

ROBERT K. SCHAEFER, *Acting Primary Examiner.*

MAX L. LEVY, ROBERT K. SCHAEFER, BERNARD A. GILHEANY, *Examiners.*